United States Patent [19]

Panush et al.

[11] Patent Number: 4,971,841

[45] Date of Patent: Nov. 20, 1990

[54] REFLECTIVE AUTOMOTIVE COATING COMPOSITIONS

[75] Inventors: Sol Panush, Farmington Hills; James M. Gelmini, Warren, both of Mich.

[73] Assignee: BASF Corporation, Southfield, Mich.

[21] Appl. No.: 363,561

[22] Filed: Jun. 8, 1989

[51] Int. Cl.$^5$ .......................... B05D 1/36; B05D 7/00
[52] U.S. Cl. .................. 427/407.1; 427/409; 428/458; 428/460; 428/461; 428/425.8
[58] Field of Search .............. 427/407.1, 409; 428/425.8, 458, 460, 461

[56] References Cited

U.S. PATENT DOCUMENTS

| | | | |
|---|---|---|---|
| 3,050,412 | 8/1962 | Coe | 117/75 |
| 3,198,759 | 8/1965 | Schmidle | 260/22 |
| 3,232,903 | 2/1966 | Schmidle | 260/33.6 |
| 3,255,135 | 6/1966 | Schmidle | 260/23 |
| 3,639,149 | 2/1972 | Benefiel | 117/73 |
| 4,048,136 | 9/1977 | Kobayashi et al. | 260/42.14 |
| 4,499,143 | 3/1985 | Panush | 428/336 |
| 4,605,687 | 8/1986 | Panush | 523/171 |
| 4,731,290 | 3/1988 | Chang | 427/409 X |
| 4,781,949 | 11/1988 | Kasari | 427/409 X |

*Primary Examiner*—Michael Lusignan
*Attorney, Agent, or Firm*—Jerry F. Janssen; Gary W. Brooks

[57] ABSTRACT

Decorative, highly reflective, adherent coatings suitable for automotive finishes comprise a base coat layer and a top coat layer. The base coat layer comprises a film-forming agent, leafing aluminum flake and, optionally, one or more colored pigmenting agents. The top coat layer comprises a transparent film-forming agent and an acidic adhesion promoting agent effective to inhibit delamination of the coating system. Optionally an alkylamine/fatty ester stabilizing agent is added to the base coat composition to stabilize the composition against deleafing during storage.

14 Claims, No Drawings

REFLECTIVE AUTOMOTIVE COATING COMPOSITIONS

TECHNICAL FIELD

This invention relates to multi-layer coating systems. More particularly, this invention concerns a multi-layer automotive coating system which exhibits a high degree of reflectance, to a method of applying such coating systems, and to the resultant coated articles.

BACKGROUND OF THE INVENTION

Multi-coat coating systems are well known in the coatings industry for coating a variety of substrates ranging from wood, plastics and composites to metal. U.S. Pat. No. 3,639,147 describes such a system for use in coating motor vehicles. Multi-coat coating systems provide metallic substrates with both the requisite protection from corrosion and marring and with pleasing decorative qualities. These two functions of coating systems are particularly important in the automobile industry where the underlying metal substrate is subjected to rigorous environmental conditions and where the appearance of the finished article is one of the most important selling features. Advances in electrocoat primer coatings have vastly improved the corrosion resistance of automobiles, while similar advances in finish coatings have provided striking new color effects and improved weather, sun, and mar resistance.

Recent years have seen the introduction of metallic, pearlescent and opalescent color effects in finish coatings for automobiles. Metallic effects, in which the appearance of sparkle is imparted to finish coatings, are generally achieved by the introduction into one or more layers of a multi-coat coating system of finely divided metallic flake or mica particles. The widespread use of aluminum pigments to produce so-called "metallic" effect finishes in automotive products began in the early 1960's and has grown steadily since. It is estimated that today more than seven out of ten automobiles manufactured has a metallic effect paint finish which incorporates aluminum and/or micaceous flake pigments. When these coatings or paint finishes for automobiles employ aluminum flake pigments, the aluminum which is used is one of the so-called "non-leafing" grades of aluminum flake. Non-leafing grades of aluminum flake are milled with appropriate milling aids which cause the flake to distribute throughout the finish coating with random orientation of the flake surfaces to produce the "sparkle" so characteristic to metallic finishes. Typical systems of this type are disclosed in U.S. Pat. Nos. 4,048,136; 4,499,143; and 4,605,687.

The Variety of rich and lustrous colors which have been made available through these metallic, opalescent, and pearlescent automotive finish coatings has whetted the appetite of the automotive consuming public. Accordingly, although multicoat coating systems have been in use for many years in the automotive industry, the art is in constant search of coating systems possessing novel or unique color effects which, at the same time, have the requisite durability, high gloss, and good color maintenance.

However, the use of so-called "leafing" grades of aluminum pigments has not been widespread in automotive finish products. Leafing aluminum flake is milled with a fatty acid lubricant to produce flake which tends to orient generally parallel to the underlying substrate surface and to aggregate in a layer close to the upper surface of the coating film. Because of this tendency to aggregate close to the surface of the paint coating, paints which contain leafing aluminum have a tendency to chalk or rub off. Moreover, the fatty acid lubricant coating on the aluminum flake can provide a site for delamination if subsequent coatings are applied. For these reasons, leafing aluminum paints have been generally restricted to such applications as reflective roofing materials, bridge and structural steel corrosion protection, and similar applications. In these applications, the bright, reflective nature and corrosion protective characteristics of leafing aluminum coatings are desirable, while the undesirable tendency of such coatings to chalk or delaminate is not a concern.

It is therefore an object of the present invention to provide a decorative coating system, primarily for use in automotive coatings, which possesses the bright, mirror-like finish of leafing aluminum.

It is a further object of the present invention to provide a decorative coating system, primarily for use in automotive coatings, in which the silvery reflective effect of the leafing aluminum is color modified by the inclusion of one or more transparent pigmenting agents.

It is a still further object of this invention to provide leafing aluminum-containing multi-layer coating systems which resist delamination.

DISCLOSURE OF THE INVENTION

It has been found that highly reflective coatings containing leafing aluminum and which have greatly improved adherence, suitable for automotive applications are produced in accordance with one aspect of the present invention. The coatings comprise a cured base coat layer formed on a substrate from a composition comprising a cured base coat layer and at least one cured top coat layer on top of the leafing aluminum-containing base coat layer. The resulting finish is highly reflective, having an almost mirror-like appearance which can be modified by the optional inclusion in the base coat of one or more transparent inorganic or organic pigmenting agents. When such pigmenting agents are included in the base coat layer, subtle color shading of the silvery finish are achieved.

The leafing-aluminum containing coating does not chalk because of the application over the base coat layer of a clear, cured transparent top coat layer which additionally supplies weather durability and protection of any included pigmenting agents. The total coating system is resistant to delamination in the region of the leafing aluminum layer by the inclusion, in accordance with this invention, of an acidic adhesion promoting agent in the top coat layer.

The base coat composition for forming the base coat layer of coatings of this invention comprises leafing aluminum flake and a first film-forming material selected from the group consisting of acrylic resins, alkyd resins, polyurethane resins, polyester resins and aminoplast resins, together with volatile organic solvents for the first film-forming material. The base coat composition may optionally contain an alkylamine/fatty ester mixture to inhibit deleafing of the aluminum during storage of the base coat composition.

The top coat composition for forming the top coat layer of coatings of this invention comprises a second film-forming material selected from the group consisting of acrylic resins, alkyd resins, polyurethane resins, polyester resins and aminoplast resins. The composition further comprises an acidic adhesion promoting agent in an amount effective to inhibit delamination of the coating system selected from the group consisting of phosphoric acid, alkylbenzenesulfonic acids wherein the alkyl group contains from one to twelve carbon atoms, and alkylnaphthylenesulfonic and dialkylnaphthylenesulfonic acids wherein the alkyl groups contain from one to twelve carbon atoms. The composition also includes volatile organic solvents for the second film-forming material.

DETAILED DESCRIPTION AND BEST MODE FOR CARRYING OUT THE INVENTION

Any substrate material can be coated with the coating system of the present invention, including such materials as glass, ceramics, plastics, and smooth-surfaced composites, depending upon the drying and/or curing requirements of the particular coating compositions used in the system. However, the coating system of the present invention is particularly adapted for metallic substrates, and specifically as an automotive paint finish system where they best exhibit their bright, reflective effects. The substrate may be bare substrate material or, in the case of metal substrates, may be pretreated to impart corrosion resistance as by phosphatizing, electrocoating, priming or other similar treatments well known in the art.

Examples of metallic substrates which can be coated with the coating system of the present invention include steel, aluminum, copper, magnesium, alloys thereof, etc. However, the chemical components of the coating system of this invention can be varied to suit the temperature tolerance of the substrate material. For example, in the case of plastic substrates, the components are constituted for air drying, or for drying at ambient temperature or curing at low temperatures, e.g. 150° F.–180° F. (65° C.–82° C.). Alternatively, in the case of metallic substrates and other substrate materials which can tolerate higher temperatures, the components of the present coating system are constituted for curing at higher temperatures e.g. over 180° F. (82° C.).

The base coat material, i.e. the pigmented polymer layer closest to the substrate, comprises any suitable film forming material conventionally used in this art, leafing aluminum metallic flake, and optionally, a colorant or pigmenting agent. Suitable film forming materials for use in formulating the basecoat compositions include acrylics, alkyds, polyurethanes, polyesters and aminoplast resins. Preferred film-forming materials for use in the base coat compositions of this invention are the acrylic resins. When acrylic resins are employed in formulating the base coat, the resins may be either thermoplastic (acrylic lacquer systems) or thermosetting. Acrylic lacquers such as are described in U.S. Pat. No. 2,860,110 are one type of film forming composition useful according to this invention in the base coat. The acrylic lacquer compositions typically include homopolymers as well as copolymers of monomers selected from methyl methacrylate, acrylic acid, methacrylic acid, alkyl esters of acrylic acid, alkyl esters of methacrylic acid, hydroxyalkyl esters of acrylic and methacrylic acid, vinyl acetate, acrylonitrile, styrene and the like. In any of the aforementioned alkyl or hydroxyalkyl esters of acrylic or methacrylic acid, the ester portion contains from one to ten carbon atoms.

The relative solution viscosities (RSV) of the film-forming acrylic laquer polymers when used either as the film-forming component of the base coat or the transparent top coat in the present invention can range from about 1.05 to about 1,40. The RSV of the polymer is defined as the quotient obtained by dividing the efflux time of a solution of 0.25 g of the polymer in 50 ml of dichloroethane by the efflux time of dichloroethane, the efflux times being measured in accordance with the procedure of ASTM D 445-46T, Method B at 25° C., using a modified Ostwald viscometer, Series 50. When the relative solution viscosity of the acrylic lacquer polymer is less than about 1.05, the resulting films have poor solvent resistance, durability and mechanical properties. On the other hand, when the relative viscosity is increased above the 1.40 level, paints made from these resins are difficult to spray and have high coalescing temperatures.

Another type of film forming material useful in forming the base coat of this invention is a combination of a cross-linking agent and a carboxy-hydroxy acrylic copolymer. Suitable monomers that can be copolymerized in the carboxy-hydroxy acrylic copolymer include hydroxyalkyl esters of acrylic and methacrylic acid, such as hydroxymethyl acrylate, hydroxymethyl methacrylate, hydroxyethyl acrylate, hydroxyethyl methacrylate, hydroxypropyl acrylate, hydroxypropyl methacrylate, hydroxybutyl acrylate, hydroxybutyl methacrylate, and the like. These materials can be copolymerized with other ethylenically unsaturated monomers such as acrylic acid, methacrylic acid, and the alkyl esters of acrylic and methacrylic acid such as methyl acrylate, methyl methacrylate, ethyl acrylate, ethyl methacrylate, propyl acrylate, propyl methacrylate, butyl acrylate, butyl methacrylate, 2-ethylhexyl acrylate, lauryl methacrylate, benzyl acrylate, cyclohexyl methacrylate, and the like. Additional monomers are acrylonitrile, methacrylonitrile, styrene, vinyl toluene, α-methyl styrene, vinyl acetate, and so forth.

The acrylic polymers formed from the above-named monomers contain pendant hydroxyl or carboxyl functionality which may be employed for further copolymerization with polyester polyols. Particularly preferred polyester polyols for this purpose for forming resins for the base coat composition are the reaction product of polycaprolactone and trimethylol propane, and hydroxy polyester acrylate available, respectively, as Tone ® 0390 polyester polyol and Tone ® Monomer M-100 from Union Carbide Corp., Solvents & Coatings Materials Division, 39 Old Ridgebury Road, Danbury, Conn. 06817).

Although the base coat can be deposited out of an aqueous carrier, it is preferred to use conventional volatile organic solvents such as aliphatic, cycloaliphatic and aromatic hydrocarbons, esters, ethers, ketones and alcohols including such things as toluene, xylene, butyl acetate, acetone, methyl isobutyl ketone, butyl alcohol, etc. and mixtures thereof.

The cross-linking agents used in combination with the hydroxy-carboxy copolymers are those compositions which are reactive with hydroxy and/or carboxylic acid groups. Examples of such cross-linking agents are polyisocyanates (typically di-and/or triisocyanates) polyepoxides and aminoplast resins. Particularly preferred cross-linking agents are the aminoplast resins.

The polyisocyanates when reacted with hydroxyl bearing polyester or polyether or acrylic polymers will yield urethane films useful in the process of this invention in both the base coat and topcoat. The isocyanate (—N═C═O)—hydroxyl (—OH) reaction takes place readily at room temperature, so that ambient and low temperature cure is possible.

Among other resins useful in the base coat are those commonly known as alkyd resins which are defined to include fatty acid or oil containing esterification products. The methods for preparing these resins are well known in the art. The preferred alkyd resins useful in this invention are those containing from about 5 to about 65 weight percent of a fatty acid or oil and having an hydroxyl equivalent to carboxy equivalent ratio of from about 1.05 to 1.75. Alkyd resins having less than about 5% fatty compound are classified as the "oil-less" alkyd resins of polyester resins described hereinafter. On the other hand, alkyd resins containing greater than 65% of a fatty compound exhibit poor baking properties, poor chemical resistance and unsatisfactory adhesion to either the base coat or the substrate. When the hydroxyl to carboxy equivalent ratio is less than about 1.05 gelation can result during polymer preparation while resins prepared having a ratio in excess of 1.75 have low molecular weights and therefore poor chemical resistance. These alkyd resins can also be used as the topcoat of this invention. When this is the case it is preferred that the oil or fatty acid portion of the alkyd resin contain a light colored baking oil or fatty acid such as coconut or dehydrated castor oils or fatty acids. Furthermore, when these resins are used as topcoats they can be reacted with various acrylic or ethylenically unsaturated monomers as described above to produce vinyl modified alkyd resins.

Curing of these alkyd resins can be accomplished by blending with any of the previously described crosslinking agents in the same weight ratios as are used with carboxy-hydroxy copolymers.

Included among the various fatty acids and oils useful in preparing these alkyd resins are the fatty acids derived from the following oils: castor, dehydrated castor, coconut, corn, cottonseed, linseed, oticica, perilla, poppyseed, safflower, soybean, tung oil, etc., and the various rosins containing tall oil fatty acids. Useful polyols include the various glycols, such as ethylene glycol, propylene glycol, neopentyl glycol, butylene glycol, 1,4-butanediol, hexylene glycol, 1,6-hexanediol, the polyglycols such as diethylene glycol or triethylene glycol, etc.; the triols such as glycerine, trimethylol ethane, trimethylol propane, etc., and other higher functional alcohols such as pentaerythritol, sorbitol, mannitol, and the like. Acids useful in preparing the alkyd resins of this invention include mono-fuctional acids such as rosin acids, benzoic acid, p-tert-butyl benzoic acid and the like: the polyfunctioal acids such as adipic acid, azelaic acid, sebacic acid, phthalic acid or anhydride, isophthalic acid, terephthalic acid, dimerized and polymerized fatty acids, trimellitic acid, and the like.

Yet another useful base coat is prepared using nonaqueous dispersions such as are described in U.S. Pat. Nos. 3,050,412; 3,198,759; 3,232,903; and 3,255,135. Typically these dispersions are prepared by polymerizing a monomer such as methyl methacrylate in the presence of a solvent in which polymers derived from the above monomer are insoluble and a precursor which is soluble in the solvent. Nonaqueous dispersions can have a relative solution viscosity as previously defined of about 1.05 to 3.0. Dispersions having a relative solution viscosity in excess of about 3.0 are difficult to spray and have high coalescence temperatures while dispersions with a relative solution viscosity less than about 1.05 have poor chemical resistance, durability and mechanical properties. The monomers useful in preparing the above-dispersed copolymers or hompolymers are those listed previously as useful in forming the carboxyhydroxy acrylic copolymers.

In another instance the base coat film can be produced from resins known as polyesters or "oil-less" alkyd resins. These resins are prepared by condensing nonfatty containing polyols and polyacids. Included among the useful polyacids are isophthalic acid, phthalic acid or anhydride, terephthalic acid, maleic acid or anhydride, fumaric acid, oxalic acid, sebacic acid, azelaic acid, adipic acid, etc. Mono basic aids such as benzoic, p-tert-butylbenzoic and the like can also be utilized. Among the polyalcohols are the diols or glycols such as propylene glycol, ethtlene glycol, bytylene glycol, 1,4-butanediol, neopentyl glycol, hexylene glycol, 1,6-hexanediol, and the like; the triols such as trimethylolethane, trimethylolpropane and glycerine and various other higher functional alcohols such as pentaerythritol.

The base coat also includes particles of metallic flake, optionally with one or more coloring or pigmenting agents. The metallic flake materials which are incorporated into the base coat layer are selected from so-called "leafing grades" of finely divided aluminum flake. The particle size of the flake is generally between about 0.1 $\mu$m and about 2.0 $\mu$m in thickness and between about 0.5 $\mu$m and about 200 $\mu$m in diameter. The metallic flake is produced by techniques well known in the trade by ball milling the appropriate metal foil in the presence of a lubricant fatty acid such as such as stearic acid which results in the production of leafing aluminum flake. Preferred materials are the leafing grades of aluminum flake of the types manufactured by the Silberline Manufacturing Co., Inc., R.D. 2 Hometown, Tamaqua, Pa. 18252 under the tradename EternaBrite ®. A particularly preferred material is Silberline L-1524 leafing grade aluminum flake.

The leafing aluminum flake tends to migrate toward the surface of the base coat layer as that layer drys and cures. The flake forms an integrated layer of overlapping flakes lying substantially parallel to the surface of the coating which imparts to the cured finish a highly reflective appearance. While not adhering to one theory to the exclusion of others, it is believed that during this process, a part of the coloring pigment which may also be included in the base coat layer is also swept toward the upper surface of the base coat layer. Pigmented base coat layers in accordance with the present invention are thus believed to comprises a relatively thick region nearest the substrate, slightly deficient in coloring pigment. Lying directly above this region is a reletively thin region in which the overlapping leafing aluminum flakes have oriented substantially parallel to the base coat surface to form a reflective layer. Above the region of the leafing aluminum flake is a relatively thin region of base coat resin containing coloring agent in a slightly higher concentration than elsewhere in the base coat layer. The resulting appearance effect of the coating system is a reflective silvery sheen which is slightly tinted by the effect of light passing into, and then reflecting out through, the thin region of the pigmented base coat lying above the region of reflective leafing aluminum.

The weight ratio of metal flake to colorant incorporated into the pigment of the base coat layer may vary between about 1 part metal flake to 99 parts colorant to 99 parts metal flake to 1 part colorant. The amount of pigment comprised of the combined metal flake and colorant employed in the base coat layer varies, with pigmenting solids in the basecoat generally ranging between about 1 percent by weight to about 20 percent by weight of the total non-volatile solids content of the base coat layer.

The pigment or coloring agent incorporated into the base coat layer may be any transparent organic or inorganic pigmenting agent known to those skilled in the coatings arts. Organic pigments are preferred because of their higher chromaticity and transparency, but in the base coat layer transparent inorganic pigments may be employed, either alone, or in combination with organic pigments to obtain the desired hiding of the substrate. Representative examples of inorganic pigments which may be used in the base coat layer include transparent iron oxide and the like. Representative examples of organic pigments which may be employed include phthalocyanine green, phthalocyanine blue, anthrapyrimidine yellow, flavanthrone yellow, imidazole orange, quinacridrone red, carbazole dioxazine violet, indanthrene blue, azo browns, isoindolinones, and high molecular weight azo pigments.

The base coat composition may further contain one or more stabilizing agents to inhibit the tendency of leafing aluminum flake to "de-leaf" during prolonged storage of the base coat composition. Preferred materials for this purpose include alkyl amines, fatty esters, and mixtures thereof. A particularly preferred stabilizer is mixture of alkylamine and fatty ester marketed under the tradename Raybo 41 Spangle by the Raybo Chemical Co., P.O. Box 2155, Huntington, W. Va. 25721. As can be seen by the data presented in Examples 20-22, the addition of this stabilizer to the base coat composition effectively inhibited the de-leafing of the aluminum in the base coat composition for periods ranging up to ninety days (at 2 wt. %) at ambient temperature.

The base coat, containing the leafing aluminum and colored pigmenting agent is overlayered by a transparent final layer which is deposited from a composition which may also be constituted of the same polymers as above recited with the caveat that the top coat must be totally transparent. This layer preferably contains ultraviolet light stabilizers or absorbers (e.g. hindered amines) to absorb and screen out ultraviolet radiation. This transparent clear coat should be applied at about 1.8 mils to 2.3 mils dry film thickness. Optimum dry film is about 1.9 mils to 2.1 mils thick. It is preferred that the clear coat layer be applied after application and curing of the base coat layer.

Utilizing the compositions of the present invention offers a means of combining the desirable properties of a combination of resin systems. For example, in automotive finishes the pigment control properties of acrylic lacquers can be combined with the chemical resistance properties of thermosetting acrylic resins by applying a thermosetting acrylic clear coat over a pigmented thermplastic acrylic lacquer base coat (although acrylic lacquers may be used for all layers). Likewise, in appliance finishes the chemical resistance of polyester resins can be combined with the lower cost of thermosetting acrylic resins by applying a polyester clear topcoat over a pigmented thermosetting acrylic base coat. Although any of the above-mentioned thermoplastic materials may be used to form the transparent topcoat, better durability is achieved if the topcoat is one of the above-cited thermosetting materials, i.e. the material containing the cross-linking agents. In all instances where the above methods and compositions are used extremely high gloss films result. In fact, using the process of this invention gloss readings in excess of 100 are readily obtained.

The base coat and the topcoat can be applied by any conventional methods in this art such as brushing, spraying, dipping, flow coating etc. Typically spray application is used, especially for automotive finishing. Various types of spraying can be utilized such as compressed air spraying, electrostatic spraying, hot spraying techniques, airless spraying techniques etc. The application of the coating layers of the present invention generally follow the application to the substrate of a conventional corrosion resistant primer or electrocoat. To this primed substrate is applied the base coat. The base coat is typically applied from about 0.4 mil to about 2.0 mils and preferably about 0.5 mil to about 0.8 mil. This thickness can be applied in a single coating pass or a plurality of passes with very brief drying ("flash") between applications of coats.

Once the base coat has been applied, the topcoat is applied after allowing the base coat is cured. The topcoat is applied thicker than the preceding coat (preferably about 1.8 mils to 2.3 mils) and can also be applied in a single or multiple pass.

The term transparent film is defined as film through which the base coat can be seen. As stated above it is prefered that the transparent film contain a UV absorbing compound and/or hindered amine UV stablizer and be substantially colorless so that the full polychromatic and aesthetic effect of the base coat-interference coat is not substantially decreased. The outstanding feature of the topcoat is the significant improvement in the durability which is provided to the overall coating. The total dry film thickness for this multi-layered coating system is typically about 3.1 mils to 4.9 mils and preferably about 3.7 mils.

The compositions and processes according to the present invention provide many improvements over the paint compositions and processes of the prior art. Unique color effects and better hiding of surface defects can be produced. Weather durable color effects are produced not available with other pigment systems while maintaining an appealing and desirable soft, lustrous appearance.

The applied compositions are not moisture sensitive, are less sensitive to criticality of applications, can withstand the elements (i.e. sun exposure), do not operate with subtractive color effects when mixed with other pigments, allow low bake repair color matching, and resist settling and chemical (e.g. acid rain) attach.

It should be noted that while the compositions of the present invention are particularly adapted for original equipment manufacture coatings for automobiles, one of their advantages is the low bake matching use as refinish compositions as well. Whereas in original equipment manufacture the disclosed cellulose esters and/or wax are typically used, such are not universally required, for example, in refinish compositions. Also, where the thermosetting polymer embodiments are preferred in the original equipment manufacture, in refinish either low temperature cure thermosetting materials e.g. 150° F.–180° F. (66° C.–82° C.) or ambient temperature cure thermosetting or thermoplastic materials are preferred.

The following examples are provided to enable one skilled in the art to practice the present invention. However, these examples are merely illustrative and are not to be read as limiting the scope of the invention as it is defined by the appended claims.

PREPARATION OF PRINCIPAL RESINS
(PRODUCTION SCALE)

EXAMPLE 1

In a clean reactor vessel was placed a solution of 3020 lb (1369.8 kg) of polycaprolactone triol (available as Tone ® 0390 Polyester Polyol from Union Carbide Corp., Solvents & Coatings Materials Division, 39 Old Ridgebury Road, Danbury, Conn. 06817), and 170 lb (77.1 kg) of cumene hydroperoxide in 39.5 liters of methyl n-amyl ketone. This mixture was stirred and heated to reflux.

In a separate tank, a mixture was prepared of 1756 lb (796.5 kg) of hydroxymethyl acrylate, 3883 lb (1761.3 kg) of butyl methacrylate, 125 lb (56.7 kg) of butyl acrylate, and 200 lb (90.72 kg) of methyl methacrylate. This mixture of acrylic monomers, together with a mixtank rinse of 8.8 gal. (33.3 liters) of methyl n-amyl ketone, was added slowly to the refluxing reactor contents over a period of about three hours. During this time the reactor contents should be maintained at a temperature between about 320–330° F. (160–166° C.) by the addition of methyl n-propyl ketone, if necessary.

At the end of this time, the reactor contents are cooled and adjusted to a total non-volatiles content of 80% by the addition of methyl n-propyl ketone. The resulting resin solution, comprising 43.2% butyl methacrylate monomer, 1.4% butyl acrylate monomer, 19.6 % hydroxymethyl acrylate monomer, 2.2% methyl methacrylate, and 33.6% polycaprolactone triol, had an acid number of 2.9 and a density of 8.79 lb/gal. (1.05 kg/liter).

EXAMPLE 2

In a clean reactor vessel, 413.8 gal. (1566.4 liters) of xylene were heated reflux. In a separate tank, a mixture was prepared of 45 lb (20.4 kg) of methacrylic acid, 1600 lb (725.8 kg) of hydroxypropyl methacrylate, 2040 lb (925.33 kg) of n-butyl methacrylate, and 1710 lb (775.6 kg) of methyl methacrylate. This mixture was added slowly over a period of two hours to the refluxing reactor contents, together with a solution of 320 lb (145.2 kg) of tert-butyl perbenzoate. Following complete addition, the resulting mixture was heated under gentle reflux for an additional one-half hour. At the end of this time, additional catalyst (80 lb, 36.29 kg of tert-butyl perbenzoate in 72.4 gal., 274.1 liters of xylene) was added to the reactor contents and the mixture was heated under reflux for an additional two hours.

At the end of this time, the reactor contents were cooled and filtered. The final resin solution, comprising 0.8% acrylic acid monomer, 29.7% hydroxypropyl methacrylate monomer, 37.8% butyl methacrylate monomer, and 31.7% methyl methacrylate monomer had an acid value of 5 and a density of 8.38 lb/gal. (1.01 kg/liter).

EXAMPLE 3

In a clean reactor vessel was placed a solution of 588 lb (266.71 kg) of cumene hydroperoxide in 751.6 gal (2845 liters) of aromatic naphtha solvent. This mixture was stirred and heated to reflux.

In a separate tank, a solution was prepared in 20.7 gal (78.4 liters) of aromatic naphtha solvent which contained 4308 lb (1954.1 kg) of styrene, 3447 lb (1563.6 kg) of 2-ethyl-hexyl acrylate, 645 lb (292.6 kg) of acrylic acid, 3447 lb (1563.6 kg) of butyl methacrylate, and 9696 lb (4398 kg) of hydroxy polyester acrylate (available as Tone ® Monomer M-100 from Union Carbide Corp., Solvents & Coatings Materials Division, 39 Old Ridgebury Road, Danbury, Conn. 06817). This mixture of styrene and acrylic monomers was slowly added to the refluxing mixture of aromatic naphtha solvent and peroxide initiator over a period of about four hours. During this time the temperature of the reactor contents slowly rose from 315° F. (157° C.) to 335° F. (168° C.).

Following the complete addition of the solution of ethylenically unsaturated monomers, a solution of 2589 lb (1174.4 kg) of a mixture of dicumyl peroxide and cumene hydroperoxide (74% peroxide content, available as RS-442 from Witco Chemical Corporation, U.S. Peroxide Division, 850 Morton Avenue, Richmond, Calif.) in 23.45 gal (88.8 liters) of xylene was added to the reactor contents, and the resulting mixture was heated under gentle reflux for a period of about three hours.

At the end of this time, the reaction mixture was cooled to 220° F. (104° C.) and adjusted to a total non-volatiles content of 75% by the addition of aromatic naphtha solvent (13.79 gal., 52.2 liters). The resulting resin solution, comprising 20% styrene monomer, 16% 2-ethylhexyl acrylate monomer, 3% acrylic acid monomer, butyl methacrylate monomer, and 45% hydroxy polyester acrylate, had an acid number of between 20 and 25 and a density of 8.58 lb/gal. (1.03 kg/liter).

| Preparation of Pigment Pastes Blue Pigment Paste Example 4 | |
|---|---|
| Ingredient | Parts by Weight |
| Grind resin (resin of Example 3 above) | 47.89 |
| C8–C10 aromatic naphtha solvent | 38.36 |
| n-Butanol | 5.56 |
| Nuosperse ® 657 (modified polyester solution in mineral spirits)* | 0.19 |
| CI Pigment Blue 15:1* | 8.00 |

*Available from Nuodex, Inc., Turner Place, Piscataway, NJ 06854.

All ingredients but the blue pigment were mixed for thirty minutes. At the end of this time, the blue pigment was slowly added to the mixture with slow speed mixing, and the resulting pigmented mixture stirred for three hours. The pigment paste was then subjected to two to four passes through a sand mill until a minimum Hegman value of 7.5 NS was obtained. The pigment paste was then filtered through a 10 micron Cuno filter with a 25 micron bag (silk outer skin on Cuno outlet) and placed in a container for subsequent use.

| Green Pigment Paste Example 5 | |
|---|---|
| Ingredient | Parts by Weight |
| Grind resin (resin of Examples 3 above) | 46.62 |
| Xylene | 29.92 |
| n-Butanol | 4.00 |
| CI Pigment Green 74260 | 10.00 |

Forty parts by weight of the grind resin and 12 parts by weight xylene were mixed for fifteen minutes. The green pigment was added to this mixture and stirred at high speed for thirty minutes. Mixing was reduced to low speed and the remainder of the resin was added, together with the remainder of the xylene and the n-butanol. The resulting mixture was stirred at slow speed for two hours. The pigment paste was then subjected to two to four passes through a sand mill. The pigment paste was then filtered through a 10 micron Cuno filter with a 25 micron bag (silk outer skin on Cuno outlet) and placed in a container for subsequent use.

Preparation of Basecoat Formulations Example 9–11

| Component | Examples | | | | | |
|---|---|---|---|---|---|---|
| | 6 | 7 | 8 | 9 | 10 | 11 |
| | (Parts by Weight) | | | | | |
| Non-Volatile Content | | | | | | |
| Principal resin of Example 1 | 38.20 | — | — | — | — | — |
| Principal resin of Example 2 | — | 55.56 | — | — | 19.54 | — |
| Principal resin of Example 3 | — | — | 40.74 | — | — | 14.68 |
| Methylated melamine formaldehyde resin | 20.37 | 20.37 | 20.37 | 20.00 | 19.54 | 20.00 |
| Leafing aluminum flake | 16.43 | 16.43 | 16.43 | 8.06 | 7.87 | 7.87 |
| Colored pigment | None | None | None | 50.48* | 38.39* | 50.48* |
| Catalyst** | 1.02 | 1.02 | 1.02 | 0.50 | 0.49 | 0.50 |
| Solvents | | | | | | |
| Methyl propyl ketone | 9.47 | — | — | 3.30 | — | — |
| Methyl amyl ketone | 11.61 | — | — | 4.02 | — | — |
| Naphtha/ mineral spirits | 12.70 | 12.81 | 12.67 | 6.08 | 5.64 | 5.00 |
| Xylene | 81.20 | 90.81 | 71.46 | 29.86 | 35.46 | 10.54 |
| Solvesso 100 | — | — | 28.04 | 54.61 | 53.28 | 81.47 |
| n-Butanol | — | — | — | — | 5.62 | — |

*A mixture of 61.9% by weight blue pigment paste of Example 4 and 38.1% by weight green pigment paste of Example 5.
**Nacure 5225 curing catalyst (amine salt of an aromatic sulfonic acid), available from King Industries, Science Road, P.O. Box 588, Norwalk, CT.

PIGMENTED LEAFING ALUMINUM BASE COAT COMPOSITIONS

EXAMPLES 12–14

Base coat enamel formulations were prepared using the principal acrylic resins of Examples 1–3 above and various combinations of leafing aluminum flake and pigmenting agents. In each case, the pigments pastes were prepared by the general methods detailed in Examples 4 and 5 above. The pigment pastes were incorporated into base coat formulations of the type represented by Examples 9, 10, and 11 above. Representative color combinations are given in the following tables.

| Ingredient (Parts by Weight) | Example | | |
|---|---|---|---|
| | 12 | 13 | 14 |
| Leafing aluminum pigment | 4.34 | 2.90 | 5.80 |
| CI Pigment Yellow 154 | 6.30 | — | — |
| Carbon Black* | — | *2.68 | — |
| CI Pigment Violet 19 | — | — | 5.00 |
| Resin vehicle | 50.13 | 48.24 | 50.13 |

-continued

| Ingredient (Parts by Weight) | Example | | |
|---|---|---|---|
| | 12 | 13 | 14 |
| Solvents | 39.23 | 46.18 | 39.07 |

CLEAR COAT RESIN

EXAMPLE 15

| Clear Coat Resin Example 15 | |
|---|---|
| Ingredient | Parts by Weight |
| Methylated, butylated melamine-formaldehyde resin (Resimene ® 755)* | 22.29 |
| Copolymer of 40.5% butyl acrylate, 37.5% styrene, and 22.0% hydroxyethyl acrylate | 36.22 |
| Copolymer of 46.2% butyl methacrylate, 22.1% hydroxyethyl acetate, 1.4% butyl acrylate, and 30% of the product of the reaction of trimethylopropane and ε-caprolactone | 30.10 |
| Tinuvin ® 440** hindered amide light stabilizer | 2.50 |
| Sanduvor ® 3206*** oxanilide UV absorber | 2.81 |
| Nacure ® 5225-P**** blocked sulfonic acid catalyst | 1.56 |
| Xylene | 4.52 |

*Available from Monsanto Chemical Co., 800 North Lindbergh Ave., St. Louis, MO 63167.
**Available from Ciba-Geigy Corporation, Ardsley, NY 10502.
***Available from Sandoz Chemical Co., 4000 Monroe Road, Charlotte, NC 28205.
****Available from King Industries, Science Road, Norwalk, CT 06852.

The clear coat resin, prepared according to generally known methods in the art using the above formulation, had a percent non-volatile content of 80%, a Gardner-Holt viscosity of U-V, and an acid number of 4–6.

COHESION TESTS

EXAMPLES 16–19

A series of tests were conducted in which varying amounts of an 85% aqueous solution of phosphoric acid were added to the clear coat composition of Example 15 to assess the effect upon inter-layer cohesion of the resulting coating system. In each case, the base coat composition of Example 6 was applied to a 4"×12" primed steel panel and the coating cured by baking at 250° F. (121° C.) for thirty minutes. The clear coat composition of Example 15 was modified by stirring in a small amount of an 80% aqueous solution of phosphoric acid. The modified clear coat composition was then sprayed over the cured base coat and cured by baking at 250° F. (121° C.) for thirty minutes. After allowing the panels to cool, they were subjected to the ASTM D 3359-83 "Standard Methods for Measuring Adhesion by Tape Test." The panels were scored with a PA-2056 scoring tool, available from the Paul N. Gardner Co., 316 N. E. First Street, Pompano Beach, Fla. The tool has six razor blades, spaced 2.0 mm apart. The panels were scored, first in one direction, and then twice more at angles of 60° from the previous score lines.

A strip of 3M Type 898 tape (3M Co., Minneapolis, Minn.) was applied over the scoring and pressed into place. The tape was then removed from the panel and the degree of adhesion of the coating film was assessed on the following scale:

5B The edges of the cuts are completely smooth; none of the squares of the lattice is detached.

4B Small flakes of the coating are detached at intersections; less than 5% of the area is affected.

3B Small flakes of the coating are detached along edges and at intersections of cuts. The area affected is 5% to 15% of the lattice.

2B The coating has flaked along the edges and on parts of the squares. The are affected is 15% to 35% of the lattice.

1B The coating has flaked along the edges of cuts in large ribbons and whole squares have detached. The area affected is 35% to 65% of the lattice.

0B Flaking and detachment is worse than Grade 1B.

A control panel was coated with the leafing aluminum-containing base coat of Example 6 and and a clear coat of Example 15 which contained no acidic adhesion promoter. Test panels were prepared using the same procedure, but using the clear coat of Example 15 to which 0.05%, 0.25%, and 0.05% by volume, respectively, of an 85% by weight aqueous solution of phosphoric acid was added. The phosphoric acid content was based on volume percent of the total clear coat composition. The results of the tape-pull adhesion tests appear in the following table.

TABLE

| Test | Clear Coat | Tape-Pull Results |
| --- | --- | --- |
| Example 16 | Examples 15 (unmodified) | 0B - Large sheets of clear coat film came away with tape. |
| Example 17 | Example 15 to which 0.05% (by volume) of phosphoric acid solution had been added | 2B |
| Example 18 | Example 15 to which 0.25% (by volume) of phosphoric acid solution had been added | 3B |
| Example 19 | Example 15 to which 0.50% (by volume) of phosphoric acid solution had been added | 3B |

The results of the tape-pull tests indicated that when the clear coat composition did not contain an acidic cohesion promoter, there was cohesive failure between the clear coat layer and the base coat layer at the region of leafing aluminum. That is, the clear coat layer which peeled away with the tape in the test had the leafing aluminum adhering to the underside of the peeled clear coat.

However, with the addition of the acidi cohesion promoter to the clear coat composition (Examples 17-19, the cohesion between the clear coat layer and the underlying leafing aluminum-containing base coat layer was dramatically improved. Considerable improvement was seen when the base coat composition contained 0.05 volume percent of the cohesion promoter, with further improvement in cohesion observed at a level of 0.25 volume percent. An increase of the cohesion promoter to a level of 0.50 volume percent did not appear to markedly further improve cohesion between the coating layers.

SHELF-LIFE STABILITY TESTS

EXAMPLES 20-22

Tests were conducted to assess the affect on shelf life and stability of the leafing aluminum-containing base coat liquid compositions resulting from the addition of a stabilizer. In these tests, base coat paint formulations were prepared which contained varying amounts of an alkyl amine, fatty acid ester stabilizer mixture (Raybo 41 Spangle, available from the Raybo Chemical Co., P. O. Box 2155, Huntington, W. Va.). The formulations were then placed in sealed cans and allowed to age for periods ranging from one to forty-five days. Aliquot samples of the paint formulations were periodically sprayed on test panels, and the spray coating heat cured. The panels were then visually inspected for de-leafing of the aluminum pigment. The effect of de-leafing was clearly visible, manifesting itself as a granular appearance to the baked finish. In addition, because of the greatly increased scattering of incident light by the de-leafed aluminum pigment, the color of panels in which the aluminum pigment had deleafed prior to spraying was gray rather than silvery, increasingly gray with the degree of de-leafing.

Tests were conducted in which 0.25 weight percent (Example 20), 1.0 weight percent (Example 21), and 2.0 weight percent (Example 22) of Raybo 41 were added to the base coat formulation. The results of these tests indicate that there is an increase in shelf life and stability of the wet, leafing aluminum-containing base coat compositions with increasing concentration of added stabilizer. At a concentrations of 0.25 weight percent, and 1.0 weight percent, base coat compositions were held for periods of 5 and 30 days, respectively, before any de-leafing of the aluminum could be detected. At 2.0 weight percent, material which had been held for ninety days at ambient temperature did not exhibit the effects of de-leafing when sprayed on test panels. Moreover, the inclusion of the alkylamine/fatty ester stabilizer to the base coat composition had no visible effect on the interlayer adherence of the base coat layer and top coat layer.

Although this invention has been shown and described with respect to detailed embodiments thereof, it will be understood by those skilled in the art that various changes in form and detail thereof may be made without departing from the spirit and scope of the invention as defined by the appended claims.

We claim:

1. A multi-layer coating system for producing adherent, decorative, highly reflective coatings on substrates comprising
   (a) a cured base coat layer formed on a substrate from a base coat composition comprising effective amounts of
      (i) a first film-forming material selected from the group consisting of acrylic resins, alkyd resins, polyurethane resins, polyester resins and aminoplast resins;
      (ii) leafing aluminum flake;
   (b) a cured transparent top coat layer deposited on said cured basecoat layer and formed from a top, coat composition comprising effective amounts of
      (i) a second film-forming material selected from the group consisting of acrylic resins, alkyd resins, polyurethane resins, polyester resins and aminoplast resins;

(ii) an acidic adhesion promoting agent in an amount effective to inhibit delamination of said coating system comprising at least one selected from the group consisting of phosphoric acid, alkylbenzenesulfonic acids wherein the alkyl group contains from one to twelve carbon atoms, and alkylnaphthylenesulfonic and dialkylnaphthylenesulfonic acids wherein the alkyl group contains from one to twelve carbon atoms.

2. A multi-layer coating system as defined in claim 1 wherein said base coat composition comprises
 (a) a cross-linking agent; and
 (b) a copolymer which is the reaction product of
  (i) from about 0.2% to about 10% of at least one ethylenically unsaturated acid selected from the group consisting of acrylic acid and methacrylic acid;
  (ii) from about 1% to about 50% of esters of acrylic or methacrylic acid with saturated alcohols of from one to ten carbon atoms;
  (iii) up to about 35% of esters of acrylic or methacrylic acid with monohydroxylated saturated alcohols of from one to ten carbon atoms;
  (iv) up to about 25% styrene;
  (v) up to about 50% of a polyester polyol copolymerizable therewith.

3. A multi-layer coating system as defined in claim 1 wherein said acidic adhesion promoting agent comprising at least one selected from the group consisting of phosphoric acid, p-toluenesulfonic acid, dodecylbenzenesulfonic acid, and dinonylnaphthalenesulfonic acid.

4. A multi-layer coating system as defined in claim 3 wherein said acidic adhesion promoting agent is present in an amount of between about 0.05 volume percent and 1.0 volume percent, based on the total volume of said top coat composition.

5. A multi-layer coating system as defined in claim 4 wherein said acidic adhesion promoting agent is phosphoric acid.

6. A multi-layer coating system as defined in claim 5 wherein said phosphoric acid is present in an amount of about 0.25 volume percent, based on the total volume of said top coat composition.

7. A multi-layer coating system as defined by claim 1 wherein said base coat composition further comprises an alkylamine/fatty ester mixture in an amount effective to stabilize said base coat composition against deleafing.

8. A multi-layer coating system as defined by claim 7 wherein said alkylamine/fatty ester mixture is present in said base coat composition in an amount of between about 0.25 weight percent and 2.0 weight percent, based upon the total weight of said base coat composition.

9. A multi-layer coating system as defined by claim 1 further comprising a transparent inorganic or organic pigmenting agent.

10. A multi-layer coating system as defined by claim 9 wherein said transparent inorganic or inorganic pigmenting agent comprises, together with said leafing aluminum, from about 1% by weight to about 20% by weight of said base coat composition, based on the total non-volatile content of said base coat composition.

11. A multi-layer coating system as defined by claim 10 wherein said pigmenting agent is selected from the group consisting of transparent iron oxide, phthalocyanine green, phthalocyanine blue, anthrapyrimidine yellow, flavanthrone yellow, imidazole orange, quinacridrone red, carbazole dioxazine violet, indanthrene blue, azo browns, isoindolinones, and high molecular weight azo pigments.

12. A method of coating substrates with decorative, adherent, highly reflective coatings comprising the steps of:
 (a) applying to said substrate a base coat coating comprising effective amounts of
  (i) a first film-forming material selected from the group consisting of acrylic resins, alkyd resins, polyurethane resins, polyester resins and aminoplast resins;
  (ii) leafing aluminum flake;
 (b) curing said base coat coating to a hard, durable coating layer;
 (c) applying on top of the cured base coat coating at least one top coat coating comprising effective amounts of
  (i) a second film-forming material selected from the group consisting of acrylic resins, alkyd resins, polyurethane resins, polyester resins and aminoplast resins;
  (ii) volatile organic solvents for said second film-forming material; and
  (iii) an acidic adhesion promoting agent in an amount effective to inhibit delamination of said coating system comprising at least one selected from the group consisting of phosphoric acid, alkylbenzenesulfonic acids wherein the alkyl group contains from one to twelve carbon atoms, and alkylnaphthylenesulfonic and dialkylnaphthylenesulfonic acids wherein the alkyl group contains from one to twelve carbon atoms; and
 (d) curing said top coat coating to a hard, durable coating layer.

13. A method as defined in claim 12 wherein said substrate is metal.

14. An article having a multi-layer, decorative, adherent, highly reflective coating comprising
 (a) a cured base coat layer formed from a base coat composition comprising effective amounts of
  (i) a first film-forming material selected from the group consisting of acrylic resins, alkyd resins, polyurethane resins, polyester resins and aminoplast resins;
  (ii) leafing aluminum flake; and
 (b) at least one cured transparent top coat layer formed from a top coat composition comprising effective amounts of
  (i) a second film-forming material selected from the group consisting of acrylic resins, alkyd resins, polyurethane resins, polyester resins and aminoplast resins;
  (ii) an acidic adhesion promoting agent in an amount effective to inhibit delamination of said coating system comprising at least one selected from the group consisting of phosphoric acid, alkylbenzenesulfonic acids wherein the alkyl group contains from one to twelve carbon atoms, and alkylnaphthylenesulfonic and dialkylnaphthylenesulfonic acids wherein the alkyl group contains from one to twelve carbon atoms.

* * * * *